May 12, 1970 — ITSUKI BAN — 3,511,508

TAPE PLAYER UTILIZING PLURALITY OF ENDLESS LOOP MAGNETIC TAPE CARTRIDGES

Filed Jan. 14, 1969 — 3 Sheets-Sheet 1

INVENTOR

ITSUKI BAN

BY Jacobs & Jacobs

ATTORNEY

INVENTOR

ITSUKI BAN

BY Jacobs & Jacobs

ATTORNEY

INVENTOR

ITSUKI BAN

BY Jacobs & Jacobs

ATTORNEY

United States Patent Office 3,511,508
Patented May 12, 1970

3,511,508

TAPE PLAYER UTILIZING PLURALITY OF ENDLESS LOOP MAGNETIC TAPE CARTRIDGES

Itsuki Ban, 829 Higashi-Oizumimachi, Nerima-ku, Tokyo-to, Japan

Filed Jan. 14, 1969, Ser. No. 791,056
Claims priority, application Japan, Jan. 16, 1968, 43/1,935
Int. Cl. G11b *5/00*
U.S. Cl. 274—4 7 Claims

ABSTRACT OF THE DISCLOSURE

A tape player utilizing a plurality of endless loop magnetic tape cartridges comprising a rotatable container storing a plurality of endless loop magnetic tape cartridges, cartridge selecting means positioning in a predetermined play position the cartridge which is selected by rotation of the container, a swingable deck provided with reproducing means such as a capstan, a magnetic head reproducing the cartridge positioned in the play position, retainer means engaging said deck in a position for reproducing the cartridge placed in the play position, whereby rotation of the container and swing of the deck are caused to be controlled to automatically reproduce the cartridge selected out of a plurality of cartridges.

Background of the invention

The present invention relates to a tape player utilizing a plurality of endless loop magnetic tape cartridges and more specifically to such player capable of storing a plurality of endless loop magnetic tape cartridges in a rotatable container to automatically reproduce a preselected cartridge.

As is well known, an endless loop magnetic tape cartridge is adapted to store a spool of endless loop magnetic tape and a pinch roller and is played by means of a tape player which is provided with a magnetic head, capstan or other reproducing member.

Many of the currently available tape players are designed to play a single cartridge. On the other hand, various types of cartridges have been proposed which are adapted to play a selected cartridge out of a plurality of cartridges in the manner that disc records in a jukebox can be played. Most of those proposed tape players utilizing a plurality of endless loop magnetic tape cartridges have a complicated mechanism for reproducing the cartridge and are required to provide magnetic heads and the like corresponding in number to the number of cartridges or an elongated capstan common to all cartridges. This causes the tape player unit to be not only bulky, complicated, and expensive but also less reliable mechanically.

In order to eliminate those defects as described, a new and improved arrangement is provided so that a rotatable container stores a plurality of cartridges and a cartridge may be selected by controlling rotation of the container. According to this arrangement, a capstan or magnetic head would serve as a common member to each cartridge.

Although there have been many proposals to store a plurality of cartridges in a container, it is preferable to radially dispose a plurality of cartridges in relation to a container. In this manner, the number of cartridges may be doubled when one is laid over the other.

Summary of the invention

It is a primary object of the invention to provide a tape player utilizing a plurality of endless loop magnetic tape cartridges capable of automatically playing the selected cartridge in predetermined position by the use of a rotatable container radially storing a plurality of endless loop magnetic tape cartridges therein and by controlling rotation of the container.

A further object of the invention is to provide a tape player utilizing a plurality of endless loop magnetic tape cartridges capable of a desired performance of the cartridge by swinging and retaining a deck with reproducing members with respect to the cartridge positioned in a predetermined play position.

Another object of the invention is to provide a tape player utilizing a plurality of endless loop magnetic tape cartridges wherein control of rotation of a container is effected by an electromagnetic plunger which is energized or deenergized by a rotary switch rotatable synchronously with the container and an alternatively selective switch selecting the cartridge to be played.

Still another object of the invention is to provide a tape player utilizing a plurality of endless loop magnetic tape cartridges wherein rotation of a container and swing of a deck are effected by rotation of a capstan and no driving source is required to rotate and swing the container and the deck so that its structure is simplified and its cost is cheap while minimizing consumption of current.

A still further object of the invention is to provide a tape player utilizing a plurality of endless loop magnetic tape cartridges wherein a deck is magnetically attracted by an electromagnet into abutment of a capstan with a pinch roller stored in the cartridge while the deck is returned to its original position when the electromagnet is demagnetized.

A further object of the invention is to provide a tape player utilizing a plurality of endless loop magnetic tape cartridges wherein a plurality of cartridges are arranged in such manner that one is laid over the other so that an inner cartridge is played when a container is initially rotated and then an outer cartridge is played when the container is next rotated.

Further objects and advantages of the invention will become apparent upon consideration of the specification and the accompanying drawings, in which:

Brief description of the drawings

FIGS. 4(*b*) and 4(*c*) are plan views of modified forms of an eccentric cam provided in the deck driving mechanism shown in FIG. 4(*a*);

Description of the preferred embodiments

Figure 1:
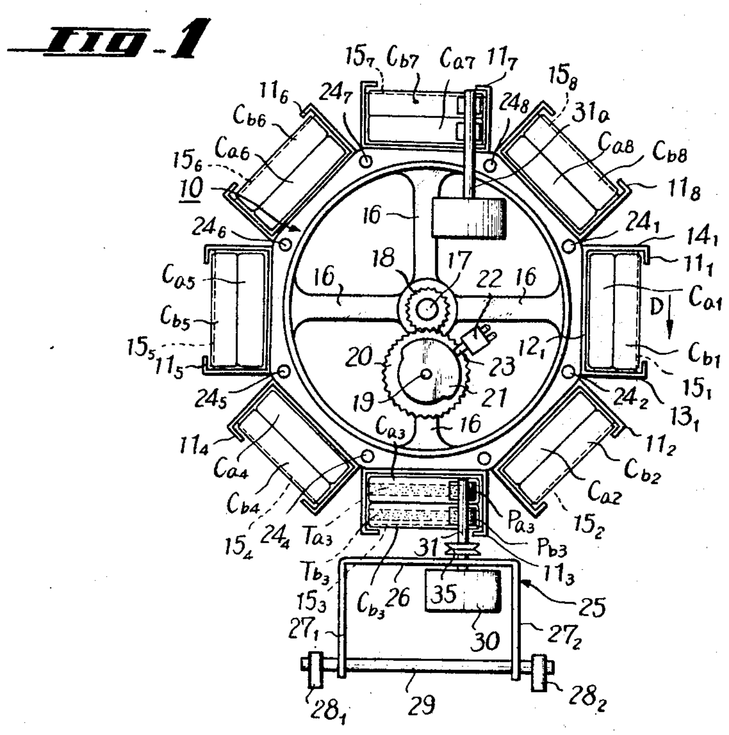
FIG. 1 is a front view of one form of tape player according to the invention, showing the relationship between a container and a deck.

Referring now to FIG. 1, numeral 10 designates an octagonal decahedral cylindrical container having frames $\mathbf{11}_1$, $\mathbf{11}_2$, $\mathbf{11}_3$ . . . $\mathbf{11}_8$ at the periphery thereof to receive sixteen endless loop magnetic tape cartridges. Since each frame 11 is identical, it is deemed sufficient to describe only one. The frame $\mathbf{11}_1$ comprises a base wall $\mathbf{12}_1$, two side walls $\mathbf{13}_1$, $\mathbf{14}_1$, and a rear wall $\mathbf{15}_1$. The free ends of the side walls inwardly and longitudinally extend at an angle of 90° with respect to the side walls $13_1$, $14_1$. A chamber defined by the base wall 12, side walls $13_1$, $14_1$ and the rear wall $15_1$ is adapted to receive and support two endless loop magnetic tape cartridges $Ca_1$, $Cb_1$ to be stacked. The cartridges $Ca_1$, $Cb_1$ are received in the frame $11_1$ in such manner that the rear edge of each cartridge is inserted into the frame from the opening of the frame 11 opposite to the rear wall $15_1$. Insertion of the cartridges $Ca_1$, $Cb_1$ is completed at a point where the rear edge of one of the cartridges engages the rear wall $15_1$. The leading edge of each cartridge projects from the frame $11_1$. The cartridges $Ca_1$, $Cb_1$ are received in the frame $11_1$ so as to be opposite to the base wall in relation to the bottom plate of the cartridge and to be parallel to one side of the container 10.

In this manner, the other cartridges $Ca_2$, $Cb_2$; $Ca_3$, $Cb_3$; . . . $Ca_8$, $Cb_8$ are inserted in each of frames $11_2$, $11_3$, . . . $11_8$. The container 10 is provided with a shaft 17 at the center thereof supported by arms 16 mounted on the container. The shaft 17 is pivoted to a pillow block (not shown) mounted on a cabinet (not shown) for a tape player constructed according to the present invention. By this arrangement the container 10 is horizontally supported. A pinion 18 is secured to the shaft 17 to mesh with a gear 20 secured to a shaft 19 pivoted to a pillow block (not shown) mounted on the cabinet for the tape player. The pinion 18 and the gear 20 are in the ratio 1:2 so that the shaft 19 makes one rotation when the shaft 17 makes two rotations. A cam 21 includes two semicircles one of which has a larger diameter than that of the other and is fixed to the shaft 19. A microswitch 22 is mounted by a bracket (not shown) on the cabinet (not shown) so as to be opposite to the cam 21. The end of an actuator 23 of the microswitch 22 engages the periphery of the cam 21. The microswitch 22 changes over the contacts thereof when the cam 21 makes a half rotation, namely, the container 10 makes one rotation. Operation of the microswitch 22 will be described when referring to FIG. 6. Apertures $24_1$, $24_2$, $24_3$ . . . $24_8$ are bored through the front edge of the container 10 so as to be opposite to each of the frames $11_1$, $11_2$ . . . $11_8$. The operation of these apertures will be detailed hereinafter.

Numeral 25 indicates a deck for mounting reproducing members which plays magnetic tapes $Ta_3$, $Tb_3$ (corresponding to the cartridges $Ca_3$, $Cb_3$) in an endless loop form received in the cartridge. The deck 25 comprises a top plate 26 and two side plates $27_1$, $27_2$ downwardly extending from the top plate 26. The side plates $27_1$, $27_2$ are pivoted to a shaft 29 of which opposite ends are supported by brackets $28_1$, $28_2$ mounted on the cabinet whereby the deck 25 is swingable about the shaft 29. An electron motor 30 is mounted on the top plate 26 at the under thereof and the shaft of the motor 30 extends through an opening (not shown) in the top plate 26. The shaft of the electron motor 30 serves as a capstan 31 which cooperates with a pinch roller ($Pa_3$, $Pb_3$ are pinch rollers corresponding to the cartridges $Ca_3$, $Cb_3$) received in the cartridge so as to hold the tape allowing it to be fed. The capstan 31 and the motor therefor may be positioned in any point around the container 10 but is preferably positioned where the cartridge is horizontally supported as shown in FIGS. 1 and 2.

Figure 2:
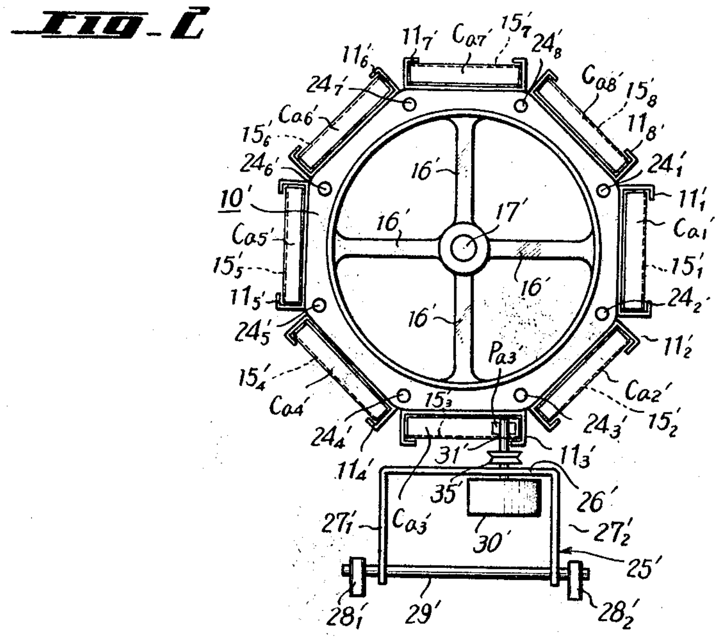
FIG. 2 is a front view of a modified form of the tape player of FIG. 1.

In FIG. 1, there is shown a container 10 adapted to store sixteen tape cartridges, however, a container shown in FIG. 2 is adapted to store six tape cartridges. Like parts in FIG. 2 are designated by like numerals with dashes. A tape player in FIG. 2 is similar to that of FIG. 1 except that frames $11'_1$, $11'_2$, $11'_3$ . . . $11'_8$ may store cartridges $C'a_1$, $C'a_2$ . . . $C'a_8$ and that there are not provided the pinion 18, gear 20, shaft 19, cam 21, and the microswitch 22.

Figures 3, 4:
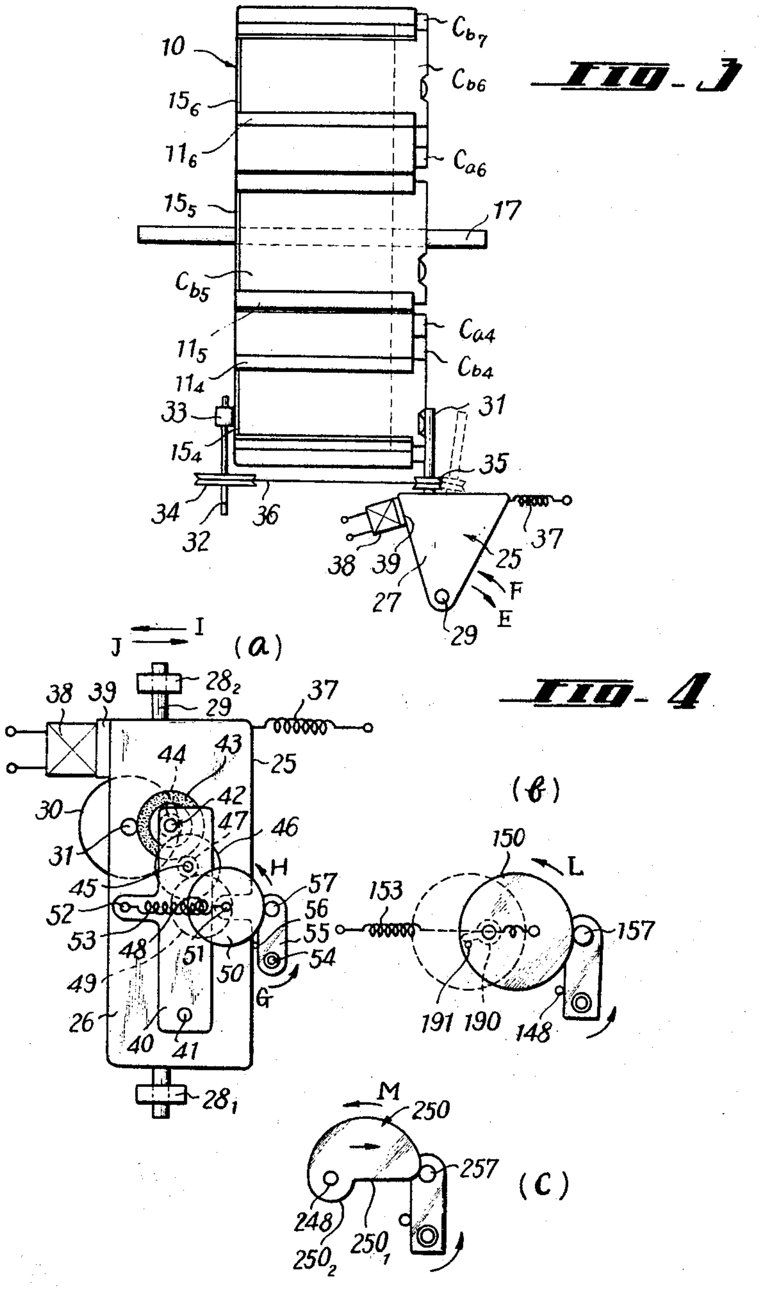
FIG. 3 is a side elevational view of the tape player shown in FIG. 1.
FIG. 4(*a*) is a plan view of a deck driving mechanism omitted in FIGS. 1 and 3.

FIG. 3 shows the container 10 and deck 25, as shown in FIG. 1, viewed from one side thereof. Like parts are indicated by like numerals. Forcedly engaged with the container 10 at the under side thereof is a rubber roller 33 which is secured to a shaft 32 pivotally mounted on a pillow bracket (not shown) provided in the cabinet. A belt 36 extends between a belt wheel 34 secured to the shaft 32 and another belt wheel 35 secured to the capstan 31. The deck 25 is normally urged by a spring 37 in the direction of arrow E. FIG. 3 shows the deck 25 in a condition that a mild steel plate 39 is attracted by an electromagnet 38 mounted on the cabinet. When the deck 25 is retained by the electromagnet 38, the capstan 31 abuts against the pinch roller in the cartridge placed in the play position to feed the tape while the tape is engaged by a magnetic head (not shown) and a switch head (not shown). During the tape reproduction, tension of the belt 36 is loosened so as not to impart rotation of the capstan 31 to the belt wheel 34. The electromagnet 38 is provided with a pair of exciting coils $38_1$, $38_2$ (FIG. 6) the former being normally supplied with weak current to swing the deck 25 against the force of the spring 37 in the direction of arrow F by means of a deck driving mechanism described hereinafter. As a result, the mild steel plate 39 is close to the magnetic circuit open ends of the electromagnet 38 to firmly attract and retain the same. On the other hand, the other exciting coil $38_2$ is supplied with pulse current to erase magnetic flux generated in the exciting coil $38_1$ to disengage the mild steel 39 from the electromagnet 38 allowing the deck 25 to be returned by the spring 37 in the direction of arrow E while the capstan 31 is brought into the position shown by a dotted line. At this moment, the belt 36 is tensioned to impart rotation of the capstan 31 to the belt wheel 34 to thus rotate the shaft 32 and rubber roller 33. Rotation of the rubber roller 33 is imparted to the container 10 by frictional force produced between the rubber roller and the container 10 to allow the container to be rotated in the direction of arrow D in FIG. 1.

Referring to FIG. 4(*a*), there is shown a mechanism for swing and driving the deck by the use of the capstan as power source. Like parts in FIG. 1 are designated by like numerals in FIG. 4. A lever 40 is pivotally mounted by a shaft 41 on the top plate 26 of the deck 25. A shaft 42 is rotatably mounted on the lever 40 and is secured to a rubber roller 43 which is rotatable by abutment of the capstan 31. A pinion 44 is secured to the shaft 42 to mesh with a gear 46 mounted on a shaft 45 rotatably supported by the lever 40. A gear 47 is also secured to the shaft 45 to mesh with a gear 49 mounted on a shaft 48 rotatably supported by the lever 40. An eccentric cam 50 is mounted on the shaft 48 and a center over spring 53 is interposed between a pin 51 on the cam 50 and a pin 52 on the lever 40.

Rotatably mounted on a shaft 54 provided on the cabinet is a lever 55 which is urged in the direction of arrow G in FIG. 4(*a*) by a spring (not shown). This urging force is arrested by a detent pin 56. The lever 55 is provided with a contact pin 57 which engages the eccentric cam 50. This causes the contact pin 57 to arrest urging force of the spring 38 producing reaction by which the rubber roller 43 is pressed by the capstan 31 to impart the capstan power to the gear trains 44, 46, 47, and 49 so that the eccentric cam 50 is rotated in the direction of arrow H. At the same time, the capstan 31 with the deck 25 is caused to be moved in the direction of arrow I against the force of the spring 37. The deck 25 in FIG. 4(*a*) is in the final stage of its movement while the mild steel piece is close to the magnetic circuit open end of the electromagnet 38 and is attracted thereto. Further rotation of the eccentric cam 50 allows it to be slightly spaced from the contact pin 57. Compressive power between the rubber roller 43 and the capstan 31 is lost, and then the eccentric cam 50 makes a rotation of 180° from the position shown in FIG. 4(*a*) and terminates its rotation. At this point, urging force of the spring 37 is arrested by magnetic attraction between the mild steel plate 39 and the electromagnet 38 so that rotation of the cam 50 is not prevented.

Figures 5, 6:
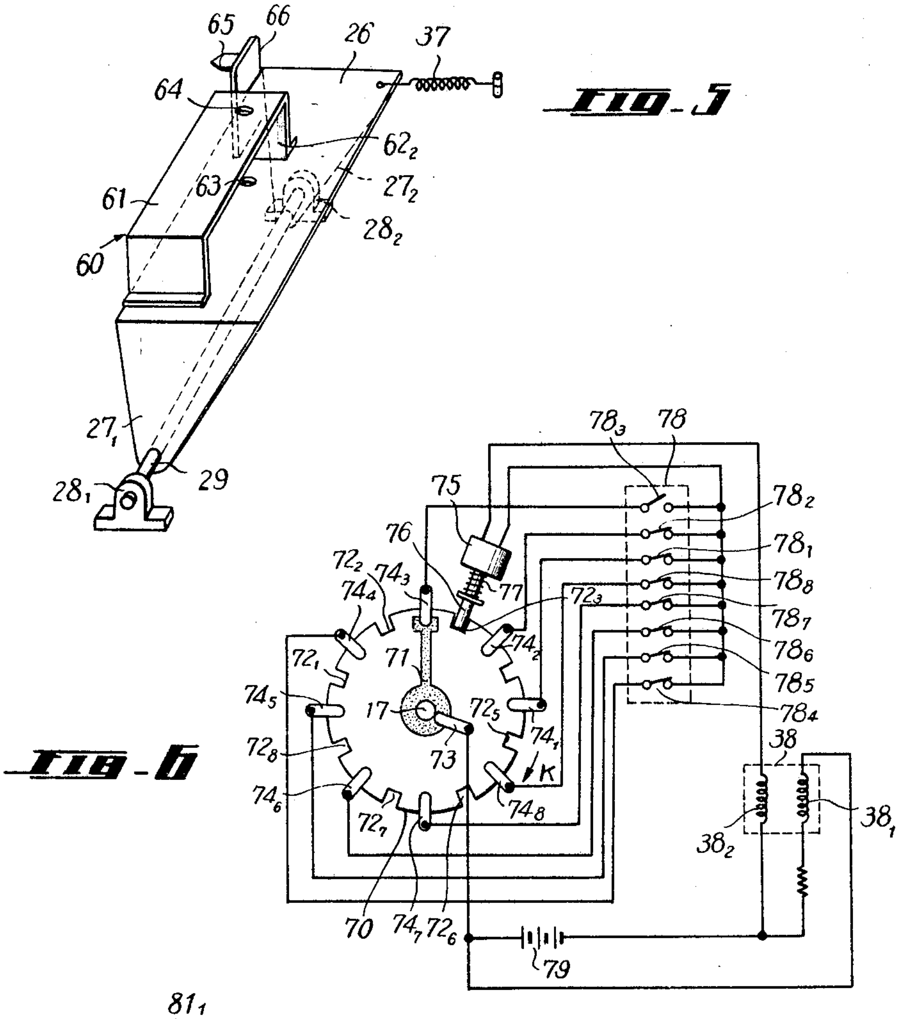
FIG. 5 is a perspective view of a deck which is omitted in FIG. 4(*a*), showing the detail of the deck, particularly of the top plate thereof.
FIG. 6 is a circuit for controlling rotation of the container shown in FIG. 1.

FIG. 5 is a perspective view of the deck with the deck driving mechanism omitted.

A sub-deck 60 is fixed to the top plate 26 of the deck 25. The sub-deck 60 comprises a top plate 61 and oppositely downwardly extending side plates $\mathbf{62}_1$, $\mathbf{62}_2$ of which lower ends, respectively are secured to the top plate 26. The deck driving mechanism shown in FIG. 4(*a*) is provided within the space between the top plate 61 and 26. Two magnetic heads and switch heads (not shown) are respectively mounted in a stack by a bracket (not shown) on the top plate 61 of the sub-deck 60. These magnetic heads and switcheads are arranged to engage the endless loop magnetic tape in the cartridges $Ca_3$ and $Cb_3$ in FIG. 1 in the play position. Apertures 63, 64 are respectively formed in the top plate 26 and 61 to allow the capstan 31 to pass therethrough. A conical rod 65 is mounted on a bracket 66 on the top plate 26. The conical rod 65 is received in the aperture 24 when the cartridges $Ca_3$, $Cb_3$ are positioned in the play position to move the deck 25 in the direction of arrow F in FIG. 3 and acts to position the cartridge in the play position in the reproducing members.

Referring to FIG. 6, there is shown cartridge selecting means for controlling rotation of the container 10 to place the cartridge to be reproduced in the play position.

Numeral 70 denotes a rotary switch plate made of insulating material of which the center is fixed to the shaft 17 of the container 10 and which is rotated synchronously with the container 10. A contact 71 of conducting material is mounted on the rotary switch plate 70. Eight depressions $\mathbf{72}_1$, $\mathbf{72}_2$, $\mathbf{72}_3$ . . . $\mathbf{72}_8$ are equally spaced along the periphery of the rotary switch plate 70. A stationary insulated base (not shown) oppositely provided on the switch plate 70, is provided with a contact 73 normally engageable with the contact 71 and the eight contacts $\mathbf{74}_1$, $\mathbf{74}_2$ . . . $\mathbf{74}_8$ successively engageable with the contact 71 when the switch plate 70 is rotated. An electromagnetic plunger 75 is provided adjacent the periphery of the switch plate 70 and the end of an armature 76 of the plunger 75 is adapted to received in any of the depressions 72 of the switch plate 70 by the force of a spring 77. In FIG. 6, rotation of the switch plate 70 is arrested by projecting the armature 76 into the depression $\mathbf{72}_3$. At this point, the contact 71 is engaged with the contact $\mathbf{74}_3$ as may be seen.

Numeral 78 designates an alternatively selective switch having eight switches $\mathbf{78}_1$, $\mathbf{78}_2$ . . . $\mathbf{78}_8$ and serving to index (select) the cartridge to be reproduced. As shown, the switches $\mathbf{78}_1$, $\mathbf{78}_2$ . . . $\mathbf{78}_8$ are respectively connected to the contacts $\mathbf{74}_1$, $\mathbf{74}_2$ . . . $\mathbf{74}_8$ and are incorporated in a current supply circuit for the electromagnetic plunger 75 and the exciting coil $\mathbf{38}_2$ of the electromagnet 38. That is, the plunger 75 and the coil $\mathbf{38}_2$ are connected through the rotary switch and the alternatively selective switch 78 to a power source 79. The exciting coil $\mathbf{38}_1$ of the electromagnet 38 is connected through a resistor 80 to the source 79 and is normally supplied with weak current. The alternatively selective switch 78 is adapted to open only one switch which is operatively depressed and to close seven switches. In FIG. 6, the switch $\mathbf{78}_3$ is operatively opened. This causes the armature 76 of the plunger 75 to be received in the depression $\mathbf{74}_3$ to arrest rotation of the rotary switch plate 70 and of the container 10 (FIG. 1) to place the cartridges $Ca_3$, $Cb_3$ stored in the frame $\mathbf{11}_3$ in the play position opposite to the deck 25.

Figure 7:
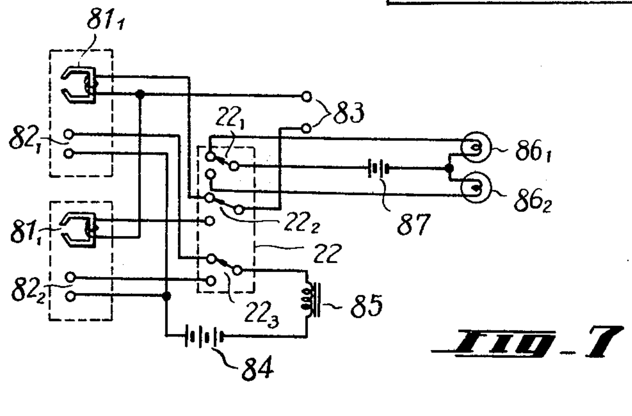
FIG. 7 is an electrical diagram of a microswitch shown in FIG. 1, showing the details of construction thereof.

FIG. 7 shows a control circuit for selecting one of two cartridges placed in the play position and reproducing the same.

Numerals $\mathbf{81}_1$, $\mathbf{81}_2$ indicates magnetic heads which are provided on the sub-deck 60 shown in FIG. 5. Numerals $\mathbf{82}_1$, $\mathbf{82}_2$ denotes switch heads which include two electrical contacts to be short-circuited by a strip of conducting foil as endmark provided on the magnetic tape. With respect to the output of the magnetic head, either one of outputs of magnetic heads $\mathbf{81}_1$, $\mathbf{81}_2$ is applied through a terminal 83 to a reproducing circuit (not shown) for the magnetic tape. In FIG. 7, there is shown the output of the magnetic head $\mathbf{82}_1$ applied to the reproducing circuit (not shown). The switch heads $\mathbf{82}_1$, $\mathbf{82}_2$ are connected through the change over switch $\mathbf{22}_3$ of the microswitch 22 and the electromagnetic plunger 85 to a power source 84. As can be seen, the switch head $\mathbf{82}_1$ is connected in series to the electromagnetic plunger 85. The plunger 85 is used in the conventional sound track switching element for vertically moving the magnetic heads $\mathbf{81}_1$, $\mathbf{81}_2$ to effect selection of the sound track. Two indicating lamps $\mathbf{86}_1$, $\mathbf{86}_2$ are connected through the change-over switch $\mathbf{22}_1$ of the microswitch 22 to a power source 87. In FIG. 7 the indicating lamp $\mathbf{86}_1$ is lit. By lighting the indicating lamps $\mathbf{86}_1$, $\mathbf{86}_2$, one can know which cartridge is reproduced in relation to the two cartridges in the play position. When the actuator 23 of the microswitch 22 is depressed by the cam 21 (FIG. 1), each change-over switch 22 of the microswitch assumes the status as shown in FIG. 7. While the actuator 23 is unpressed by rotation of the cam 21, each of the change-over switches $\mathbf{22}_1$, $\mathbf{22}_2$, $\mathbf{22}_3$ is changed over to light the indicating lamp $\mathbf{86}_2$ and to apply the output of the magnetic head $\mathbf{82}_2$ to the reproducing circuit (not shown) allowing the switch head $\mathbf{82}_2$ to be connected in series to the electromagnetic plunger 85. When the container 10' shown in FIG. 2 is used, the microswitch 22 is not required since only one cartridge is placed in the play position.

The detail of mode of operation with respect to the tape player as mentioned hereinbefore will be described.

When reproduction of the magnetic tape is effected the deck 25, as shown in FIGS. 3 and 4, is retained through the mild steel plate 39 by the electromagnet 38 and the capstan 31 abuts against the pinch rollers $Pa_3$, $Pb_3$ in the cartridges $Ca_3$, $Cb_3$ (FIG. 1) in the play position so that the tapes $Ta_3$, $Tb_3$ are drivingly transported. On the other hand, the microswitch 22 is operated by the cam 21 and the change-over switches $\mathbf{22}_1$, $\mathbf{22}_2$, $\mathbf{22}_3$ are changed over (FIG. 7) so that the cartridge $Ca_3$ is actually reproduced. Reproduction of the cartridge $Ca_3$ is identified by the depressed switch $\mathbf{78}_3$ (FIG. 6) and lighting of the indicating lamp $\mathbf{86}_1$ (FIG. 7). When reproduction of the cartridge $Ca_3$ comes near the end and the strip of conductive foil as the endmark on the tape $Ta_3$ short circuits the electrical contacts of the switch head $\mathbf{82}_1$ (FIG. 7), the electromagnetic plunger 85 is energized to change over the sound track.

Next, reproduction of the further cartridge $Ca_1$ is desired, and then the switch $\mathbf{78}_1$ for the alternatively selective switch 78 may be operated. As a result of opening of the switch $\mathbf{78}_3$ following operation of the switch $\mathbf{78}_1$, current from the source 79 is applied through the switch $\mathbf{78}_3$, contact 71, and contact 73 to the electromagnetic plunger 75 and the exciting coil $\mathbf{38}_2$. Thus, the armature 76 of the plunger 75 is disengaged from the depressor $\mathbf{72}_3$ in the switch plate 70 to allow the electromagnet 38 to release attractive engagement with the deck 25. This deck is swung and returned to its original position in the direction of arrow J in FIG. 4(*a*) by the force of the spring 37 allowing the eccentric cam 50 to engage the contact pin 57. A spring (not shown) urging the lever 55 in the direction of arrow G serves to absorb shock caused by the eccentric cam 50 and the contact pin 57. Returning of the deck 25 to its original position moves the capstan 31 to the position shown by the dotted line in FIG. 3 spaced from the cartridges $Ca_3$, $Cb_3$ and the container to be rotated. The belt 36 is, therefore, tensioned to impart rotation of the capstan 31 to the rubber roller 33 for initiating rotation of the container 10 in the direction of arrow D in FIG. 1. With rotation of the container 10, the rotary switch plate 70 is synchronously rotated in the direction of arrow D. At this moment, connection between the contacts $74_3$ and 71 is cut off and the electromagnetic plunger 75 is deenergized to return the armature 76 by the force of the spring 79, however, the rotary switch plate 70 is maintained as rotated since the end of the armature 76 just abuts against the periphery of the switch plate 70. Prior to the end of the armature 76 being opposite to the depression $72_2$, the contact $74_2$ and contact 71 are in contact with each other while the switch $78_2$ is closed so that the plunger 75 is again energized to prevent the armature 76 from engaging into the depression $72_2$. Rotation of the switchplate is, therefore, maintained. After disconnecting the contacts $74_2$ and 71, the contact $74_1$ and 71 are in contact with each other, however, the armature 76 engages the depression $72_1$ by the force of spring 79 since the electromagnetic plunger is deenergized. As a result, rotation of the rotary switch plate 70 and of the container 10 are arrested. At this time, the container 10 is moved to a position where the frame $11_4$ is opposite to the deck 25 to place the cartridges $Ca_1$, $Cb_1$ in the play position. After termination of rotation of the container 10, the belt 36 slips off the belt wheels 34, 35 and the rubber roller 33 in turn slips off the container 10. By returning the deck 25 to its original position, container 10 is caused to be rotated to select the cartridge to be reproduced while the eccentric cam 50 engages the compact pin 57 to counterclockwise rotate the lever 40 (FIG. 4(*a*)) round the shaft 41 to thus abut the rubber roller 43 against the capstan 31 and rotate the roller 43. Rotation of the rubber roller 43 is imparted through the gear trains 44, 46, 47, 49 to the eccentric cam 50 to allow it to be rotated in the direction of arrow H. The eccentric cam 50 before rotation thereof is in a position where it rotates 180° from the position as shown, namely, the least biased position by means of the center over spring 53. Further rotation of the cam 50 slowly moves the deck 25 against the force of the spring 37 in the direction of arrow I in FIG. 4(*a*). When the cam 50 rotates 180° and comes to the position as shown, namely, the maximum biased position, the steel plate 39 of the deck 25 is close to the magnetic circuit open end of the electromagnet 38 for attaching the mild steel plate 39 to retain the deck 25. Next rotation of the cam 50 allows the eccentric cam 50 to be slightly spaced from the contact pin 57 to weaken abutment force between the rubber roller 43 and the capstan 31. The cam 50 may be returned to the initial position by means of the spring 53. When the deck 25 is swung in the direction of arrow I by rotation of the eccentric cam 50, the conical rod 65 (FIG. 5) is received in the aperture $24_1$ to secure relative position of the container 10 and the deck 25 in a precise manner. In this manner, the cartridge $Ca_1$ which is indexed (selected) by the switch $78_1$ of the alternatively selective switch 78 and the micro-switch $22_2$ is reproduced. Now, the switch $78_6$ is operated, the cartridges $Ca_6$, $Cb_6$ are placed in the play position in the same manner as described in the foregoing, however, the cartridge $Cb_6$ out of the two is actually played because the microswitch 22 is opposite to the reduced semi-circle of the cam 20 and it is, therefore, not operated so that the change over switches $22_1$, $22_2$, $22_3$ are changed over from the condition shown in FIG. 7. Reproduction of the cartridge $Cb_6$ is identified by the operated switch $78_6$ and lit indicating lamp $86_2$. From the foregoing, it is apparent that the cartridge stored in the container may be selected as desired and thus played. It is, of course, required that the period when the deck 25 is moved in the direction of arrow I in FIG. 4(*a*) by the eccentric cam 50 be longer than that when the indexed (selected) cartridge by rotation of the container 10 is placed in the play position. The structure of the eccentric cam 50 may take either form as shown or FIG. 4(*a*) or 4(*b*).

In FIG. 4(*b*), a lever 190 is secured to a shaft 148 similar to the shaft 48 and an eccentric cam 150 similar to the cam 50 is rotatably mounted on the shaft 148. Rotation of the shaft 148 is imparted through a pin 191 provided on the lever 190 and the cam 150. When the cam 150 is rotated in the direction of arrow L and brought into the position shown by the solid line, the deck 25 is retained by the electromagnet 38 in the same manner as mentioned. The next moment, abutment force between the cam 150 and a contact pin (similar to the contact pin 57 in FIG. 4(*a*)) is weakened to terminate rotation of the shaft 148 so that the cam 150 makes rotations of 180° by means of a center over spring 153 and occupies the position shown by the dotted line. When the deck 25 is returned to initiate rotation of the shaft 148, the eccentric cam 150 is still maintained at a standstill since the lever 190 does not engage the pin 191 unless the shaft 148 rotates of 180° due to the pin 191 in the dotted line. Accordingly, while the cam 150 is maintained at a standstill, that is, the deck 25 is in the initial position, the container 10 is caused to be rotated so as to bring the indexed (selected) cartridge in the play position so that selection of the cartridge is securely effected in a precise manner.

A modified form of the cam is shown in FIG. 4(*c*). When a cam 250 is in the position shown, the deck 25 is attractively retained by the electromagnet 38 to play the cartridge in the play position. Returning of the deck 25 moves the cam 250 in the rightward direction. At this time, a contact pin 257 slidably moves along the straight line $250_1$ of the cam 250 and engages an arcuated portion $250_2$. Thus, while the cam 250 makes a half rotation with rotation of a shaft 248 (similar to the shaft 48 in FIG. 4(*a*)), the deck 25 is maintained at a standstill and thereafter the deck 25 is operated in the same manner as described hereinbefore. According to the arrangement shown in FIG. 4(*c*), the center over spring is not required to thus simplify the structure of the cam and elements to obtain the same effect as in FIG. 4(*b*).

If current is inadvertently cut off from the power source or interruption of current is caused, the deck 25 is automatically returned to its initial position by the force of the spring 37 since current is not applied to the exciting coil $38_1$ of the electromagnet 38 to weaken attractive force by the electromagnet to the deck 25. This eliminates troubles such as deformation of the pinch roller or adhering engagement of the magnetic tape with the pinch roller which may be caused by non-operation for some hours.

The alternatively selective switch 78 in FIG. 6 may be spaced from the cabinet of the tape player so that selection of the cartridge depends upon remote control. The microswitch 22 in FIG. 7 may be manually operated without rotating the container 10 to effectively select the cartridge in the container. The indicating lamp then may be limited to one. In this case, the played cartridge is identified by the on-and-off condition of the lamp.

From the above description, it is apparent that the present invention provides an improved tape player due to the arrangement that a plurality of the cartridges are radially disposed along the periphery of a container thereby not only multiplying the cartridges stored in the container but also the apparatus is not bulky and complicated.

Although the invention has been described with reference to preferred embodiments, it is apparent that many modifications may be made by those skilled in the art.

What is claimed is:

1. A tape player utilizing a plurality of endless loop magnetic tape cartridges, comprising a rotatably supported container having a plurality of receptacles to radially store along the periphery thereof a plurality of cartridges, each cartridge containing an endless loop magnetic tape and a pinch roller; rotatable driving means for said container; cartridge selecting means including an engaging member having a plurality of engaging portions opposite each of the cartridges in said container and rotatable synchronously with said container, an electromagnetic plunger provided with an armature engageable with any one of the engaging portions of said engaging member, a rotary switch incorporated in a current supply circuit for said plunger and including a movable contact rotatable synchronously with said engaging member, a plurality of fixed contacts opposite each engaging portion of said engaging member, a cartridge selective switch comprising a plurality of switches connected opposite each of fixed contacts whereby engagement of the engaging portion of the engaging member with the armature of the electromagnetic plunger arrests rotation of the container to position the cartridge selected by the cartridge selective switch in predetermined position; a swingable deck having a reproducing member including a capstan, a magnetic head for reproducing the cartridge positioned by said cartridge selecting means; an electromagnet for retaining the deck in the position where the cartridge is positioned by a magnetically attracting magnetic member plate provided on said deck; a current supply control circuit for said electromagnet; a spring for swingably returning said deck in the direction away from the cartridge at the termination of the tape reproduction; said deck being returned to its initial position during rotation of the container for selecting the cartridge and said deck being caused to be swung to initiate reproduction of the cartridge.

2. A tape player utilizing a plurality of endless loop magnetic tape cartridges as set forth in claim 1 wherein a plurality of apertures are provided on said container opposite the cartridge receptacles, a rod is provided on said deck receivable by each of said apertures, and said rod being inserted into a said aperture for defining the relative position of the reproducing member on the deck and the cartridge.

3. A tape player utilizing a plurality of endless loop magnetic tape cartridges as set forth in claim 2 wherein said container driving means comprises a belt wheel, a capstan on which the belt wheel is mounted, a roller abutting said container, a belt wheel rotatable with said roller, a belt interposed between said two belt wheels, and means for imparting rotation of the capstan to the container only when said deck is returned to its initial position.

4. A tape player utilizing a plurality of endless loop magnetic tape cartridges as set forth in claim 3 wherein said deck driving means comprises a lever pivoted to the deck, a roller rotatably pivoted to said lever and rotatable by abutting against the capstan, an eccentric cam to which rotation of said roller is imparted by a gear train and being thus rotatable, a contact pin mounted opposite said eccentric cam, a center over spring the urging force of which to return said eccentric cam to the least biased position, and the deck being swingable by reaction caused by abutment of the eccentric cam and the contact pin.

5. A tape player utilizing a plurality of endless loop magnetic tape cartridge as set forth in claim 4 wherein said electromagnet includes a first and second exciting coil, the first exciting coil being normally energized so that a magnetic flux is generated to magnetically attract the deck, and retention of the deck is released by erasing the magnetic flux generated in the first exciting coil by current applied to the second exciting coil.

6. A tape player utilizing a plurality of endless loop magnetic tape cartridges as set forth in claim 1 wherein each receptacle in said container is shaped to snugly receive two cartridges, the plurality of cartridges being received in a stack to put one over the other in the container, the two cartridges being positioned in predetermined position, two magnetic heads provided opposite the two cartridges, and one output is reproduced in changing over the output of the two magnetic heads through a microswitch caused to effect the change over of switch whenever said container makes one rotation.

7. A tape player utilizing a plurality of endless loop magnetic tape cartridges as set forth in claim 6 wherein an indicating lamp is provided to be lit by changing over the switch of said microswitch, and said indicating lamp being lit thereby indicating which one of the two cartridges has been selected.

References Cited

UNITED STATES PATENTS

| | | | |
|---|---|---|---|
| 3,343,687 | 9/1967 | Deighton et al. | 242—55.13 |
| 3,127,178 | 3/1964 | Osborne et al. | 274—4 |
| 3,083,269 | 3/1963 | Gaubert | 179—100.2 |
| 2,905,029 | 9/1959 | Gustafson. | |
| 2,670,212 | 2/1954 | Heller et al. | 179—100.2 |

HARRY N. HAROIAN, Primary Examiner